United States Patent
Tjabringa

[11] Patent Number: 6,158,577
[45] Date of Patent: Dec. 12, 2000

[54] INCLINED CONVEYOR FOR AGRICULTURAL HARVESTING MACHINES

[75] Inventor: Heiko Tjabringa, Siddeburen, Netherlands

[73] Assignee: Artemis Kautschuk-und Kunststofftechnik GmbH & Cie, Germany

[21] Appl. No.: 09/196,646

[22] Filed: Nov. 19, 1998

[30] Foreign Application Priority Data

Nov. 19, 1997 [DE] Germany .............. 197 51 244

[51] Int. Cl.⁷ .................................................. B65G 15/54
[52] U.S. Cl. .................................. 198/848; 198/698
[58] Field of Search ............................ 198/848, 698, 198/867.11, 803.14

[56] References Cited

U.S. PATENT DOCUMENTS

| | | | |
|---|---|---|---|
| 510,558 | 12/1893 | Sargent | 198/848 |
| 1,285,448 | 11/1918 | Spooner | 198/848 |
| 1,766,754 | 6/1930 | King | 198/848 |
| 2,309,155 | 1/1943 | Anderson et al. | |
| 2,714,257 | 8/1955 | Reading | 198/803.14 |
| 2,880,848 | 4/1959 | Lundy et al. | 198/848 |
| 3,154,459 | 10/1964 | Cranston | 198/848 |
| 3,296,062 | 1/1967 | Truslow | 198/848 |
| 3,356,207 | 12/1967 | Hensel | 198/848 |
| 4,653,788 | 3/1987 | McDonald | 198/848 |
| 5,671,839 | 9/1997 | Sanderson | 198/848 |
| 5,725,084 | 3/1998 | Jager | 198/848 |

FOREIGN PATENT DOCUMENTS

| | | | |
|---|---|---|---|
| 26 01 500 | 1/1976 | Germany . | |
| 4218884 A1 | 12/1993 | Germany | 198/848 |

*Primary Examiner*—Douglas Hess
*Attorney, Agent, or Firm*—Robert W. Becker & Associates

[57] ABSTRACT

An endless conveyor for conveying tuberous agricultural products has at least two parallel and spaced-apart, pull-resistant, flexible belts extending in the conveying direction of the conveyor. Spaced-apart and parallel followers extend perpendicularly to the conveying direction. The followers are connected to the belts and have projections arranged in the transverse direction perpendicular to the conveying direction. A web having portions extending between the followers for supporting the tuberous agricultural products is provided. The web has flexible, pull-resistant, elongate web elements extending angularly to one another and having crossing points. The web elements are connected fixedly to one another at the crossing points and define mesh openings. The mesh openings in the area of the followers are penetrated by the projections.

12 Claims, 1 Drawing Sheet

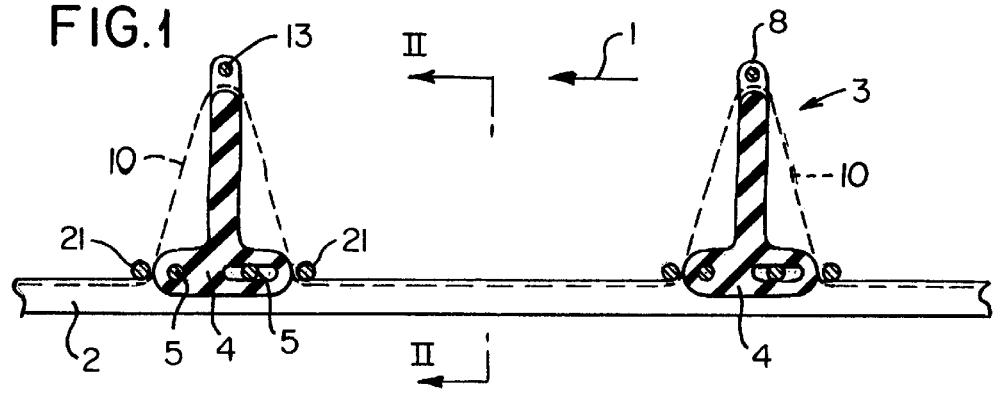
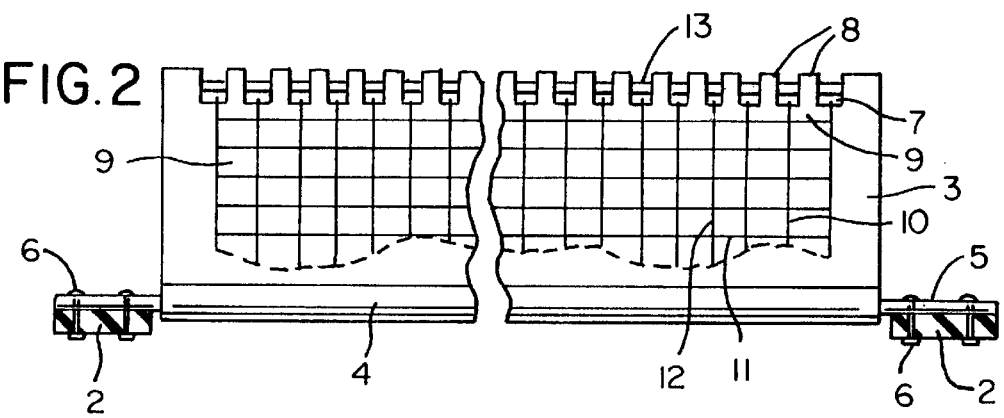
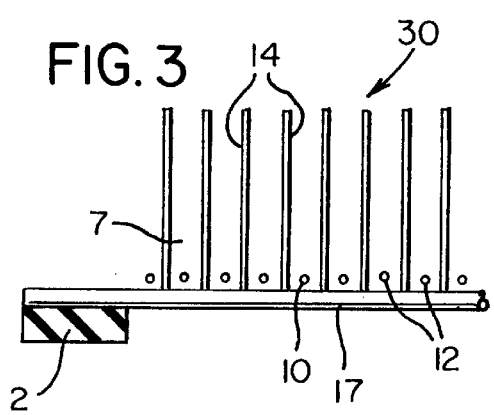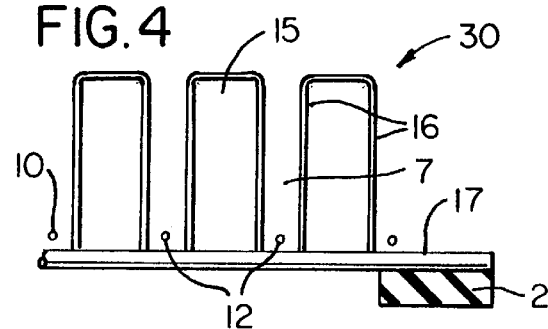
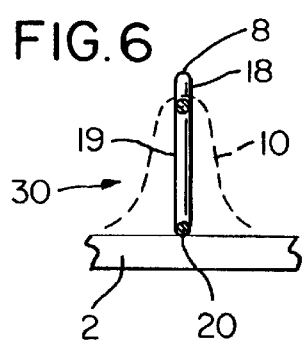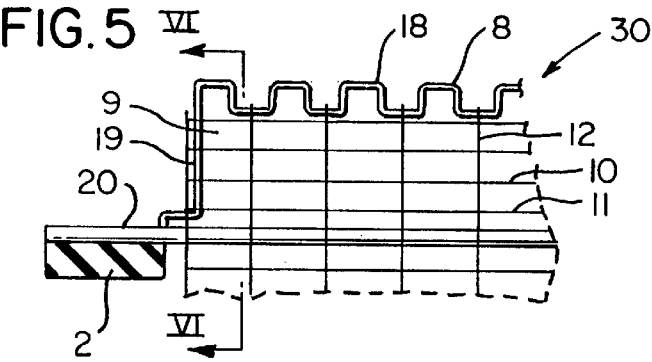

INCLINED CONVEYOR FOR AGRICULTURAL HARVESTING MACHINES

BACKGROUND OF THE INVENTION

The present invention relates to an inclined conveyor for agricultural harvesting machines, especially for harvesting tuberous agricultural products such as potatoes. The inclined conveyor comprises two or more parallel, pull-resistant, flexible belts extending in the conveying direction. Followers extending transverse to the conveying direction and spaced apart from one another are connected to the belts. Between the followers receiving elements for the goods to be conveyed are provided.

In known conveyors of this kind the receiving elements for the goods to be conveyed are formed by spaced-apart rods. Conveyors of this kind are, in general, referred to as sieve rod belts because the spaced-apart rods, on the one hand, are provided for conveying and, on the other hand, provide a certain degree of a separating or sieving action.

Such conveyors, however, have a relatively large weight caused mostly by the transversely extending rods which are, in general, comprised of steel.

These disadvantages are to be eliminated by the present invention for a conveyor of the aforementioned kind, i.e., a weight reduction is to be achieved.

SUMMARY OF THE INVENTION

As a solution to this object it is inventively suggested to provide the followers with projections extending in a direction transverse to the conveying direction and designed for engagement of mesh openings of a web which is comprised of flexible, pull-resistant, cord-shaped web elements, for example, cords, cables, or narrow bands with fixed (shear-resistant) connection at their crossing points, whereby the web extends from one follower to the neighboring follower.

Accordingly, the comparatively light-weight web provides the aforementioned receiving element for the materials to be transported while fastening of the web in the area of the followers is provided by form-locking engagement of the projections of the followers in the mesh opening of the web. It is also possible to provide a securing action against accidental removal of the web from the followers, for example, by providing crossbars at the followers. The web portion between neighboring followers can be embodied without support by tensioning the web. However, for heavy goods to be conveyed, this web portion can be supported on transverse rods connected to the lateral belts.

The followers can be embodied as profiled members consisting of rubber or a similar material and anchored on transverse rods. The upper ends of the followers are provided with a plurality of adjacently arranged projections for engagement of the web. However, the followers can also be embodied comb-shaped with projections for being receiving in the mesh openings of the web.

BRIEF DESCRIPTION OF THE DRAWINGS

The object and advantages of the present invention will appear more clearly from the following specification in conjunction with the accompanying drawings, in which:

FIG. 1 shows a part-sectional view of a circulating conveyor belt for an inclined conveyor of a potato harvesting machine;

FIG. 2 shows a view along the line II—II of FIG. 1;

FIGS. 3 and 4 show part-sectional views of other embodiments of the conveyor belt for conveying potatoes;

FIG. 5 shows a further embodiment in part-sectional view of a conveyor belt for conveying potatoes;

FIG. 6 shows a section along the line VI—VI of FIG. 5.

DESCRIPTION OF PREFERRED EMBODIMENTS

The present invention will now be described in detail with the aid of several specific embodiments utilizing FIGS. 1 through 6.

The circulating conveyor belt moving in the direction of arrow 1 has at both lateral edges a pull-resistant, flexible, flat belt 2 consisting of rubber with reinforcement members. Transversely extending followers 3 are connected to the belts and are spaced from one another. The followers 3 allow operation as an inclined conveyor.

The followers 3 are profiled members consisting of rubber or a similar material and have a widened foot section 4 penetrated by two stiff rods 5, for example, consisting of steel, having ends that are fastened to the belts 2 by riveting (see reference numeral 6) or similar means. By providing the rods 5 in a paired arrangement the followers 3 are prevented from tilting.

At the upper edge, the follower 3 is provided with a plurality of recesses 7 so that a number of small projections 8 are provided which engage the mesh openings 9 of a web 10. This web 10 is comprised of pull-resistant web elements (cords or thin cables) 11, 12 which are fixedly connected to one another at their crossing points so as to be shear-resistant. The web elements 11, 12 define square mesh openings 9. The web elements 12 extend in the conveying direction 1 while the web elements 11 are positioned at a right angle thereto. The mesh opening 9 has a width of approximately 0.5 to 5 cm, preferably 1 to 3 cm.

Since the projections 8 engage the mesh openings 9, the web 10 is securely held and can not be moved. In order to secure that the web 10 can not be lifted off the projections 8, the projections 8 are provided with a bore which may receive a securing rod 13 inserted into the bores above the web 10. The rod 13 extends across the entire width of the follower 3 and is fixated thereat by inherent elastic behavior (internal stress) of the rubber.

In close vicinity in front of and behind the foot portion 4 crossbars 21 are provided having ends that are also connected to the lateral belts 2. The web 10 is guided underneath these crossbars 21 as shown in FIG. 1. Between the crossbars 21 the web 10 extends without any further support to the adjacent follower 3. However, the web 10, when the spacing between the followers 3 is larger, can also be supported by one or more transverse supports.

The tensioning of the web 10 results in an arrangement as shown in FIG. 1 that is, in general, sufficient to receive and support the goods to be conveyed. In order to prevent transverse contraction, the web 10 can be fixed at its edges in the area of the belts 2, for example, by hooks. An undesired longitudinal movement of the web 10 is not possible because form-locking engagement at the upper edge of the follower 3 is provided.

In the embodiment according to FIGS. 1 and 2, the web 10 is guided across the follower 3 and thus is positioned in the plane defined by the belts 2 only in the area between the followers 3. In the embodiment according to FIGS. 3 and 4, the follower 30 is comprised of individually arranged elements. In the embodiment according to FIG. 3 individual rods 14 are provided. In the embodiment according to FIG. 4 U-shaped brackets 15 having downwardly extending legs 16 supported at transverse rod 17 are provided. The transverse rod 17 is secured against tilting by having lateral projections or similar means. The rods 14 or brackets 15 engage the mesh openings 9 of the web 10 and ensure that a longitudinal movement of the web 10 relative to the followers 30 is prevented. The web 10 in the embodiment according to FIGS. 3 & 4 is thus positioned over its entire length in the plane that is defined by the belts 2. The web 10 thus rests on the transverse rods 17.

The conveyor belt according to FIGS. 5 and 6 corresponds substantially to the embodiment according to FIGS. 1 and 2. However, the follower 3 comprised of rubber is replaced by a bent rod consisting of steel etc. having an upper transverse portion 18 that is wave-shaped in order to provide the projections 8. The vertically extending legs 19 are connected to a transverse rod 20 fastened to the belts 2.

The web 10 can also be embodied such that its web elements 11, 12 are positioned at an angle of approximately 45° relative to the conveying direction 1.

The specification incorporates by reference the disclosure of German priority document 197 51 244.5 of Nov. 19, 1998.

The present invention is, of course, in no way restricted to the specific disclosure of the specification and drawings, but also encompasses any modifications within the scope of the appended claims.

What is claimed is:

1. An endless conveyor for conveying tuberous agricultural products, said conveyor comprising:

at least two parallel and spaced apart, pull-resistant, flexible belts (2) extending in a conveying direction (1) of said conveyor;

spaced apart and parallel followers (3, 30) extending perpendicularly to said conveying direction (1);

said followers (3, 30) connected to said at least two belts (1);

said followers (3, 30) having each an upper edge remote from said at least two belts, wherein said upper edges have projections (8) arranged in a transverse direction perpendicular to said conveying direction (1);

a web (10) having portions extending between said followers (3, 30) for supporting the tuberous agricultural products;

said web (10) comprised of flexible, pull-resistant, elongate web elements (11, 12) extending angularly to one another and having crossing points;

said web elements (11, 12) connected fixedly to one another at said crossing points and defining mesh openings (9);

said mesh openings (9) in the area of said followers (3) being penetrated by said projections (8) and said web (10) suspended from said upper edges.

2. A conveyor according to claim 1, wherein said followers (3) are comprised of a profiled member consisting of rubber.

3. A conveyor according to claim 1, further comprising detachable securing rods (13) extend in said transverse direction and placed onto ends of said projections (8) penetrating through said web (10) for securing said web (10) at said projections (8).

4. A conveyor according to claim 1, wherein:

each one of said followers (30) comprises a bent rod (18) and a transverse rod (20);

said transverse rod (20) has ends connected to said at least two belts (2);

said bent rod (18) has opposed legs (19) connected to said ends of said transverse rod (20);

said bent rod (18) being bent so as to provide said projections (8).

5. A conveyor according to claim 1, further comprising crossbars (21) positioned parallel and adjacent to said followers (3) in front of and behind said followers (3) in said conveying direction (1), wherein said crossbars (21) are connected to said at least two belts (2) and wherein said web (10) is guided underneath said crossbars (21).

6. A conveyor according to clam 1, wherein said web elements (11, 12) are angularly arranged relative to said conveying direction (1).

7. A conveyor according to claim 6, wherein said web elements (11, 12) are arranged at an angle of 45° relative to said conveying direction (1).

8. A conveyor according to claim 1, wherein said web (10) is tensioned in the area of said projections (8, 14, 15) and between said followers (3, 30).

9. A conveyor according to claim 1, wherein said web (10) spans the area between said followers (3, 30) without support.

10. A conveyor according to claim 1, wherein said mesh openings (9) have a width of 0.5 cm to 5 cm.

11. A conveyor according to claim 1, wherein said mesh openings (9) have a width of 1 cm to 3 cm.

12. A conveyor according to claim 1, wherein a first set of said web elements (12) extend in said conveying direction (1).

* * * * *